United States Patent [19]
Delavaux

[11] Patent Number: 5,060,312
[45] Date of Patent: Oct. 22, 1991

[54] POLARIZATION INDEPENDENT COHERENT LIGHTWAVE DETECTION ARRANGEMENT

[75] Inventor: Jean-Marc P. Delavaux, Wescosville, Pa.

[73] Assignee: AT&T Bell Laboratories, Murray Hill, N.J.

[21] Appl. No.: 488,568

[22] Filed: Mar. 5, 1990

[51] Int. Cl.$^5$ ............................................ H04B 11/16
[52] U.S. Cl. .................................................... 359/192
[58] Field of Search ...................... 455/616, 619; 370/2

[56] References Cited

U.S. PATENT DOCUMENTS

| 4,718,120 | 1/1988 | Tzeng | 455/619 |
| 4,829,598 | 5/1989 | Auracher | 455/619 |

FOREIGN PATENT DOCUMENTS

| 0251062 | 1/1988 | European Pat. Off. | 455/619 |
| 0322893 | 7/1989 | European Pat. Off. | 455/619 |
| 0177520 | 7/1989 | Japan | 455/619 |

OTHER PUBLICATIONS

"Polarization Diversity Coherent Optical . . . ," *ECOC 88*, Sep. 1988, M. Shibutani et al., pp. 151-154.
"Integrated Optics 90° Hybrid . . . ," *Electr. Lett.*, vol. 24, No. 22 Oct. 1988, D. Hoffann et al. pp. 1324-1325.
"Active Controlled Fiber Optical 90° Hybrid . . . ," G. Berenbrock et al. *IEEE Photonics Tech. Lett.*, vol. 1, No. 4, Apr 1989, pp. 86-87.
"Integrated Optics Eight-Port 90° Hybrid . . . ," D. Hoffmann et al., *IEEE J. Lightwave Tech.*, vol. 7, No. 5, May 1989, pp. 794-798.

*Primary Examiner*—Curtis Kuntz
*Assistant Examiner*—L. Pascal
*Attorney, Agent, or Firm*—W. W. Koba

[57] ABSTRACT

A polarization independent coherent lightwave detection arrangement is disclosed which utilizes an optical hybrid including a single polarization beam splitter and a set of three polarization manintaining optical couplers (one input, two output). By controlling the polarization state of the local oscillator to remain at a fixed value, polarization independent recovery of a transmitted data signal may be accomplished. Phase independence may be incorporated by replacing the pair of output polarization maintaining optical couplers with a pair of phase diversity optical hybrids.

5 Claims, 3 Drawing Sheets

POLARIZATION INDEPENDENT COHERENT LIGHTWAVE DETECTION ARRANGEMENT

BACKGROUND OF THE INVENTION

1. Field of the Invention

The present invention relates to a polarization independent coherent lightwave detection arrangement and, more particularly, to a coherent detection arrangement where only the polarization state of the local oscillator must be known to recover information from the transmitted optical signal. The arrangement utilizes only a single polarization beam splitter to provide polarization independent operation.

2. Description of the Prior Art

Optical lightwave detection systems have been extensively described in the literature. Such systems offer nearly ideal detection sensitivity, as well as selectivity similar to that obtained at radio frequencies. In coherent lightwave systems which use heterodyne/homodyne techniques, the polarization state of the local oscillator must be matched to the polarization state of the incoming transmitted signal in order to achieve accurate recovery of the data. Any departure from polarization matching will result in degradation of the system performance. One solution to the problem of polarization matching is the utilization of a polarization diversity receiver arrangement which insures correct operation of the system, despite any fluctuations in the polarization state of the received data signal. In general, a polarization diversity arrangement functions to split both signals into known, orthogonal polarization states and separately manipulate each orthogonal component.

Several variations of polarization diversity schemes have been proposed and demonstrated. One particular prior art scheme utilizes an optical hybrid including a single beam splitting cube and a set of optical three couplers to provide the required orthogonal signal components. A description of this particular arrangement is contained in an article entitled "Polarization diversity coherent optical receiver with a balanced receiver configuration", by M. Shebutani et al., appearing in the *Proceedings of the ECOC* 88, September 1987, at pp. 151-3. In the Shebutani et al. arrangement, the message signal components, after polarization separation, are mixed with the local oscillator in a 3 dB fiber coupler. The local oscillator signal is divided equally by a 3 dB coupler and the polarization state of each local oscillator component is manipulated, using polarization adjusters, to match the polarization state of its paired message signal component. However, since the polarization state of each signal is subject to drift, the polarization adjusters must be continuously monitored to insure optimum system performance.

An alternative technique which is truly polarization independent and requires no active monitoring is disclosed in U.S. Pat. No. 4,718,120 issued to L. D. Tzeng on Jan. 5, 1988. In the Tzeng arrangement, the transmitted signal and local oscillator are simultaneously applied as inputs to a 3 dB coupler. The coupler outputs are then directed into a pair of polarization beam splitters which perform the polarization diversity function on the combination of the transmitted signal and local oscillator. The polarization diversity outputs from the pair of beam splitters are then directed into a balanced receiver which converts the optical signals into electrical representations and performs an electrical demodulation to recover the transmitted data. This arrangement is a viable solution, but the ability to provide matched polarization beam splitters which maintain the orthogonality between the various signal components may be difficult to achieve in some applications.

Therefore, a need remains in the prior art for a coherent lightwave detection system which is truly polarization independent and requires a minimum number of sensitive components.

SUMMARY OF THE INVENTION

The need remaining in the prior art is addressed by the present invention which relates to a polarization independent coherent lightwave detection arrangement and, more particularly, to a coherent detection arrangement where only the polarization state of the local oscillator must be known to recover information from the transmitted optical signal. The arrangement utilizes only a single polarization beam splitter to provide polarization independent operation.

In accordance with one embodiment of the present invention, a coherent lightwave detection arrangement utilizes an optical hybrid including a single polarization beam splitter and a set of three polarization maintaining optical couplers (an input coupler for dividing and a pair of output couplers for combining). The set of four outputs from the optical hybrid (two of a first polarization state and two of an orthogonal polarization state) are subsequently applied as inputs to a receiver which converts the lightwave signals into electrical representations and demodulates the electrical signals to recover the data. In operation of the optical hybrid, a received message signal is applied as an input to the polarization beam splitter to form a pair of orthogonal components. A local oscillator signal is applied as an input to the input coupler/divider, where the coupler is configured so as to provide as an output a pair of substantially equal (in terms of power) local oscillator components. A component from each signal is applied as an input to one of the pair of output coupler/combiners. The pair of output couplers thus provide as the output from the optical hybrid a set of four mixed signals (including both received message signal and local oscillator), two signals of each polarization state. In accordance with the teachings of the present invention, the optical waveguides interconnecting the polarization beam splitter and set of polarization maintaining couplers are preferably polarization maintaining guides in order to provide optimum system performance.

In an alternative embodiment, the optical hybrid of the present invention may simultaneously process a pair of message signals without requiring any additional components. In particular, the message signals are applied to orthogonal input ports of the polarization beam splitter. The orthogonality between the resultant components at the splitter output results in a system with relatively low crosstalk. A pair of local oscillators (operating at different frequencies) is then used to demodulate and recover the separate data signals.

In accordance with yet another embodiment, an optical hybrid may be modified to provide both polarization and phase diversity. Phase diversity allows for the use of broader linewidth lasers by providing a first pair of outputs with relative phases of 0° and 180° and a second pair of outputs with relative phases of 90° and 270°. The optical hybrid of this particular embodiment of the present invention utilizes two such phase diversity arrangements, one for each polarization state. Therefore, the output from the hybrid consists of eight separate optical signals—four of each polarization state.

It is an advantage of the present invention that by fixing the polarization state of the local oscillator, only a single polarization beam splitter is utilized, resulting in improved performance over prior art arrangements.

In one particular embodiment of the present invention, the optical hybrid may be monolithic in form, with the polarization beam splitter and set of polarization maintaining optical couplers formed as part of an optical substrate and interconnecting polarization maintaining integrated optical waveguides utilized to couple together the various devices.

In an alternative embodiment of the present invention, the optical hybrid may be formed using discrete devices, with polarization maintaining optical fiber used to interconnect the devices.

Other and further advantages of the present invention will become apparent during the course of the following discussion and by reference to the accompanying drawings.

BRIEF DESCRIPTION OF THE DRAWING

Referring now to the drawings, where like numerals represent like components in several views.

DETAILED DESCRIPTION

Figure 1:
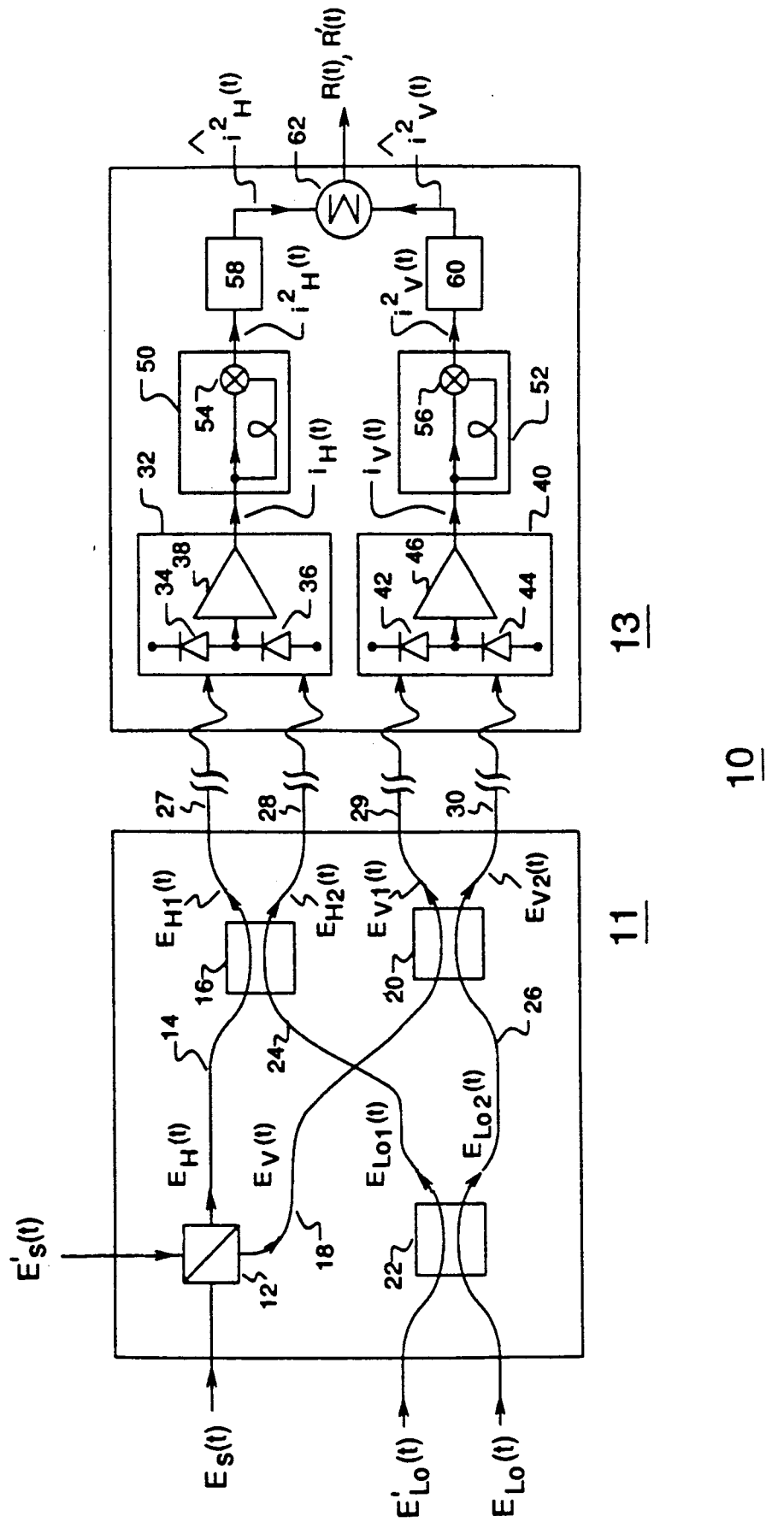
FIG. 1 illustrates a polarization independent coherent lightwave detection arrangement utilizing an optical hybrid formed in accordance with the present invention.

A coherent lightwave detection system 10 which is insensitive to, or independent of, the polarization state of the received message signal is illustrated in FIG. 1. Referring to FIG. 1, system 10 includes an optical hybrid 11 for reception of the incoming optical signals and a receiver 13 which converts the output of optical hybrid 11 into an electrical representation of the recovered data signal. In particular, optical hybrid 11 receives as a pair of inputs a received lightwave message signal $E_s(t)$ and a local oscillator lightwave signal $E_{LO}(t)$. Message signal $E_s(t)$ is presumed for the present discussion to be a DPSK signal which can be expressed as follows:

$$E_s(t) = M(t)\sqrt{2P_s} \cos [\omega_s t + \theta_s(t)],$$

where M(t) represents the DPSK modulation signal having values of either +1 for a logic "1" or −1 for a logic "0". The value $\omega_s$ is defined as the carrier frequency and $\theta_s(t)$ is the phase noise associated with the carrier. Similarly, local oscillator signal $E_{LO}(t)$ can be expressed as:

$$E_{LO}(t) = \sqrt{2P_{LO}} \cos [\omega_{LO} t + \theta_{LO}(t)],$$

where $\omega_{LO}$ is the carrier frequency and $\theta_{LO}(t)$ is the phase noise associated with the carrier.

Referring to FIG. 1, message signal $E_s(t)$ is first applied as an input to a polarization beam splitting means 12 which functions to split signal $E_s(t)$ into a pair of orthogonal components. Means 12 may comprise a polarization beam splitting cube, a fiber polarizer, or any other device capable of providing the required polarization splitting function. For the sake of the present discussion, the orthogonal components will be referred to as a "vertical" (V) component $E_V(t)$ and a "horizontal" (H) component $E_H(t)$. When performing the polarization beam splitting, the power $P_s$ of message signal $E_s(t)$ is split into orthogonal components as represented by the following:

$$P_s = p^2 P_s \hat{H} + (1-p^2) P_s \hat{V},$$

where $p^2$ represents the portion of message signal $E_s(t)$ which is of the "horizontal" polarization and the quantity $(1-p^2)$ represents the portion of signal $E_s(t)$ which is of the "vertical" polarization. The quantity "p" is unknown and in most cases will vary as a function of time. The outputs from splitting means 12 can thus be expressed as:

$$E_H(t) = M(t)\sqrt{2p^2 P_s} \cos [\omega_s t + \theta_s(t) + \phi_1],$$

and $$E_V(t) = M(t)\sqrt{2(1-p^2)P_s} \cos [\omega_s t + \theta_s(t) + \phi_2],$$

where $\phi_1$ and $\phi_2$ depend on the phase of the polarization components of the input signal $E_s(t)$, measured relative to the polarization axes of polarization beam splitter 12. Component $E_H(t)$ is then coupled into a first section 14 of polarization maintaining waveguide and propagates through hybrid 11 into a first polarization maintaining coupler 16. In a similar manner, component $E_V(t)$ is coupled into a second section 18 of polarization maintaining waveguide and is applied as an input to a second polarization maintaining coupler 20. It is to be understood that the term "polarization maintaining waveguide" as used throughout this description is presumed to include polarization optical fiber or, alternatively, polarization maintaining integrated waveguides, the latter utilized when optical hybrid 11 is formed as a monolithic structure, incorporating integrated waveguides within an optical substrate.

As shown in FIG. 1, local oscillator signal $E_{LO}(t)$ is applied as an input to a third polarization maintaining coupler 22 of hybrid 11, which functions to split signal $E_{LO}(t)$ into relatively equal power components. Since the polarization state of the local oscillator is known (and is fixed as a function of time), coupler 22 may be designed to evenly split the power $P_{LO}$ of the local oscillator between the two output branches. Therefore, the local oscillator output signals from coupler 22 can be expressed as the following:

$$E_{LO1}(t) = \frac{E_{LO}(t)}{\sqrt{2}}, \text{ and}$$

$$E_{LO2}(t) = \frac{jE_{LO}(t)}{\sqrt{2}}; \text{ or}$$

$$E_{LO1}(t) = \sqrt{P_{LO}} \cos [\omega_{LO} t + \theta_{LO}(t)],$$

and $$E_{LO2}(t) = \sqrt{P_{LO}} \sin [\omega_{LO} t + \theta_{LO}(t)].$$

Referring to FIG. 1, local oscillator component $E_{LO1}(t)$ is subsequently launched into a section 24 of polarization maintaining waveguide which is coupled as the second input to first polarization maintaining coupler 16. Similarly, component $E_{LO2}(t)$ is launched into a section 26 of polarization maintaining waveguide which is coupled as the second input to second polarization maintaining coupler 20.

In accordance with the principles of the present invention, polarization maintaining waveguides 14, 18, 24 and 26 are applied to couplers 16 and 20 such that the inputs thereto are of the same polarization state and will therefore combine as they travel through their respective couplers. For example, it will be assumed that the local oscillator is linearly polarized and launched in polarization maintaining waveguides 24 and 26 such that it will align with the "horizontal" polarization component $E_H(t)$ of message signal $E_s(t)$. Therefore, the combination of $E_H(t)$ with $E_{LO1}(t)$ in first coupler 16 will naturally provide their sum without any need for adjustment. The outputs from first coupler 16 can thus be expressed as:

$$E_{H1}(t) = \frac{[E_H(t) + jE_{LO1}(t)]}{\sqrt{2}}, \text{ and}$$

$$E_{H2}(t) = \frac{[E_{LO1}(t) + jE_H(t)]}{\sqrt{2}}; \text{ or}$$

$$E_{H1}(t) = M(t)p \sqrt{P_s} \cos(\omega_s t + \theta_s(t) + \alpha_H) +$$

$$\sqrt{\frac{P_{LO}}{2}} \sin(\omega_{LO} t + \theta_{LO}(t) + \beta_H), \text{ and}$$

$$E_{H2}(t) = M(t)p \sqrt{P_s} \sin(\omega_s t + \theta_s(t) + \alpha_H) +$$

$$\sqrt{\frac{P_{LO}}{2}} \cos(\omega_{LO} t + \theta_{LO}(t) + \beta_H),$$

where $\alpha_H$ and $\beta_H$ are defined as the phase shift introduced by hybrid component 16.

In contrast to the above, component $E_V(t)$ of the message signal which is applied to coupler 20 will be orthogonal to component $E_{LO2}(t)$ if no adjustment is performed. Thus, the two signals will not properly combine. Therefore, in accordance with the teachings of the present invention, section 18 (or, section 26) of polarization maintaining waveguide is modified so as to affect a 90° rotation at the input to coupler 20. The rotation will insure that component $E_V(t)$ will align with local oscillator component $E_{LO2}(t)$. If waveguides 18, 26 are formed of polarization maintaining optical fiber, the rotation may be easily accomplished simply by physically rotating the appropriate fiber 90° at the input to coupler 20. As with first coupler 16, the outputs $E_{V1}(t)$ and $E_{V2}(t)$ from second coupler 20 can be expressed as follows:

$$E_{V1}(t) = \frac{[E_V(t) + jE_{LO2}(t)]}{\sqrt{2}}, \text{ and}$$

$$E_{V2}(t) = \frac{[E_{LO2}(t) + jE_V(t)]}{\sqrt{2}}; \text{ or}$$

$$E_{V1}(t) = M(t)\sqrt{1-p^2} \sqrt{P_s} \sin(\omega_s t + \theta_s(t) + \alpha_V) -$$

-continued $$\sqrt{\frac{P_{LO}}{2}} \cos(\omega_{LO} t + \theta_{LO}(t) + \beta_V), \text{ and}$$

$$E_{V2}(t) = -M(t)\sqrt{1-p^2} \sqrt{P_s} \cos(\omega_s t + \theta_s(t) + \alpha_V) +$$

$$\sqrt{\frac{P_{LO}}{2}} \sin(\omega_{LO} t + \theta_{LO}(t) + \beta_V),$$

where $\alpha_V$ and $\beta_V$ are defined as the phase shift introduced by hybrid component 20. The presence of the components "p" and "$\sqrt{1-p^2}$" in the above equations indicates that there remains a polarization dependence in these output signals. Therefore, at the output of couplers 16 and 20, the signals are launched into polarization maintaining waveguides so as to maintain the orthogonality between the two pairs of outputs. Referring to FIG. 1, it is shown that signal $E_{H1}(t)$ is launched into polarization maintaining waveguide 27, signal $E_{H2}(t)$ into polarization maintaining waveguide 28, signal $E_{V1}(t)$ into polarization maintaining waveguide 29, and lastly, signal $E_{V2}(t)$ into polarization maintaining waveguide 30. As shown in FIG. 1, waveguides 26-30 form the output of optical hybrid 11.

The outputs from hybrid 11 are subsequently applied as the inputs to receiver 13, where receiver 13 first performs an optical/electrical conversion and subsequently demodulates the electrical signals to recover therefrom the transmitted message signal. Referring to FIG. 1, signals $E_{H1}(t)$ and $E_{H2}(t)$ are applied as inputs to a first balanced receiver 32 which functions to convert the optical signals into electrical representations thereof. In particular, signal $E_{H1}(t)$ is applied as an input to a first photodiode 34 and signal $E_{H2}(t)$ is applied as an input to a second photodiode 36. The photocurrent outputs are then combined in an amplifier 38 to provide as an output of first balanced receiver 32 a photocurrent denoted $i_H(t)$. Similarly, signals $E_{V1}(t)$ and $E_{V2}(t)$ are applied as inputs to a second balanced receiver 40, including a pair of photodiodes 42, 44 and an amplifier 46, where second balanced receiver will generate as an output a second photocurrent, denoted $i_V(t)$. In general, photocurrents $i_H(t)$ and $i_V(t)$ can be expressed as follows:

$$i_H(t) = C[E_{H1}^2(t) - E_{H2}^2(t)],$$

and $$i_V(t) = C[E_{V1}^2(t) - E_{V2}^2(t)],$$

where C is defined as the known constant $\eta e/h\omega$. Referring to the above equations, it can be shown that $$E_{H1}^2(t) = \frac{P_{LO}}{4} + \frac{pP_s}{2} + M(t)p \sqrt{P_{LO} \frac{P_s}{2}} \sin(\omega_{IF} + \phi(t)), \text{ and}$$

$$E_{H2}^2(t) = \frac{P_{LO}}{2} + \frac{pP_s}{2} - M(t)p \sqrt{P_{LO} \frac{P_s}{2}} \sin(\omega_{IF} + \phi(t)),$$

where $\phi(t) = \theta_{LO}(t) - \theta_s(t)$, and $\omega_{IF}$ is the intermediate frequency defined as $\omega_{LO} - \omega_s$. Subtracting $E_{H2}^2(t)$ from $E_{H1}^2(t)$ will solve for the photocurrent $i_H(t)$ and yield the following relationship:

$$i_H(t) = 2CM(t)p\sqrt{P_{LO}\frac{P_s}{2}}\sin[\omega_{IF}t + \phi(t)],$$

since the DC terms $P_{LO}/4$ and $P_s/2$ will cancel. In a similar manner, it can be shown that $$i_V(t) = 2CM(t)\sqrt{1-p^2}\sqrt{P_{LO}\frac{P_s}{2}}\sin[\omega_{IF}t + \phi(t)].$$

Both photocurrents $i_H(t)$ and $i_V(t)$ still contain "p" terms and as such are considered to be polarization dependent. The polarization dependence can be removed utilizing a signal squaring operation, as discussed in detail below.

Referring to FIG. 1, photocurrent $i_H(t)$ is applied as an input to a first squaring device 50 and photocurrent $i_V(t)$ is applied as an input to a second squaring device 52. Device 50 (in this particular example, a delay demodulator) functions to split current $i_H(t)$ into first and second components and subsequently delay one component by a time period $\tau$ with respect to the other component. The delay is illustrated in FIG. 1 as a loop within device 50. The signals $i_H(t)$ and $i_H(t-\tau)$ are then multiplied together by a multiplier 54 to form a first squared output current $i_H^2(t)$, where $i_H^2(t)$ can be expressed as:

$$i_H^2(t) = 2C^2M(t)M(t-\tau)p^2 P_{LO} P_s \cos(\Delta\phi),$$

where $\Delta\phi$ is defined as the quantity $\phi(t)-\phi(t-\tau)$. Similarly, photocurrent $i_V(t)$ is applied as an input to squaring device 52, including a multiplier 56, to form a second squared output current $i_V^2(t)$, where $$i_V^2(t) = 2C^2M(t-\tau)(1-p^2)P_{LO}P_s \cos(\Delta\phi).$$

In accordance with the teachings of the present invention, the delay $\tau$ in each squaring device 50, 52 should be essentially identical.

The squared output currents $i_H^2(t)$ and $i_V^2(t)$ are subsequently filtered by a pair of bandpass filters 58, 60 to remove any unwanted harmonic components. The filtered signals $\hat{i}_H^2(t)$ and $\hat{i}_V^2(t)$ are then electrically summed in an adding means 62 to provide the output recovered message signal R(t) from detection system 10. In particular, $$R(t) = i_H(t) + i_V(t)$$
$$= [(1-p^2)+p^2]\cdot[C^2M(t)M(t-\tau)P_{LO}P_s\cos(\Delta\phi)]$$
$$= C^2M(t)M(t-\tau)P_{LO}P_s\cos(\Delta\phi),$$

where the polarization dependent components "p" and "$1-p^2$" have been eliminated from the recovered message signal R(t), by virtue of the squaring operation.

The system as shown in FIG. 1 may be used, as mentioned above, to recover a pair of separate input signals, without requiring any additional components. As shown, a second input signal $E'_s(t)$ is applied as a second input to polarization beam splitter 12 in a manner such that the output components from splitter 12 will be orthogonal with respect to original signal $E_s(t)$. That is, the components of both signals traveling along waveguide 14 will be orthogonal and, similarly, the components traveling along waveguide 18 will be orthogonal. Advantageously, the properties of a polarization maintaining waveguide are such that orthogonal polarizations of the same state will both be guided, with minimal crosstalk. An additional local oscillator $E'_{LO}(t)$ (at a frequency other than $\omega_{LO}$) is applied to the remaining input of coupler 22 for mixing with $E'_s(t)$ to provide the same types of mixed signals as discussed above. Utilizing the same hybrid 11 and receiver 13, therefore, the application of a second message signal will results in the recovery of a second data signal, denoted R'(t) in FIG. 1.

Figure 2:
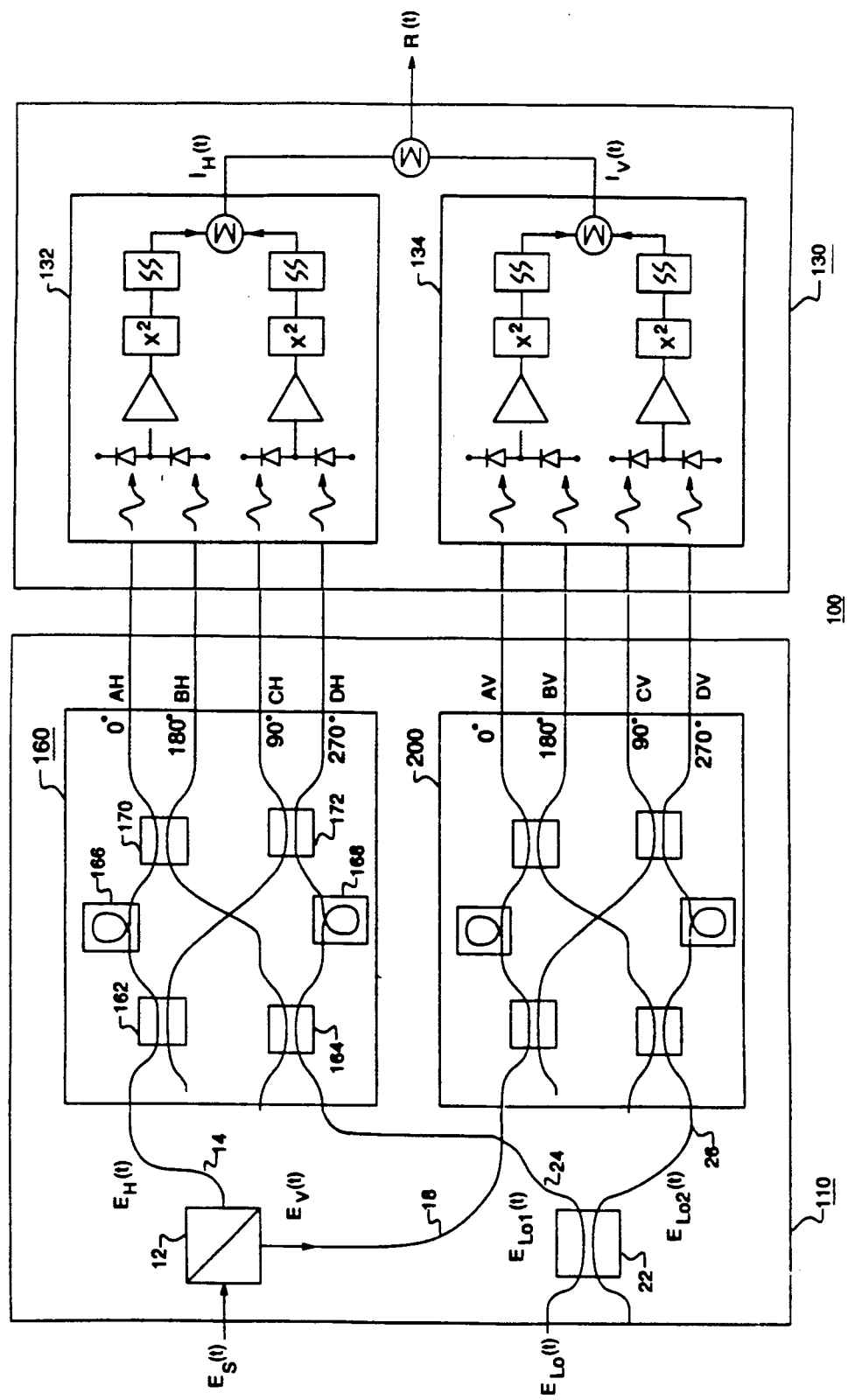
FIG. 2 illustrates an alternative coherent detection arrangement utilizing a polarization and phase independent optical hybrid formed in accordance with the present invention.

As discussed above, the techniques of the present invention may be extended to applications where it is desired to provide both polarization and phase diversity. FIG. 2 illustrates a particular detection arrangement 100 which is capable of providing these functions. Phase diversity is particularly useful in relieving the narrow linewidth restriction of the laser sources, as discussed above. In particular, an optical hybrid may be used to form a set of four optical signals with a first pair having a relative phase difference of 0° and 180°, and a second pair with relative phases of 90° and 270°. Any change in phase of the signals at the input to the hybrid will thus be canceled by the summing operation performed on the set of output signals, similar to the polarization diversity calculations described above. A complete description of an exemplary phase diversity arrangement may be found in the article entitled "Integrated Optics Eight-Port 90° Hybrid on LiNbO$_3$", by D. Hoffmann et al. appearing in the *Journal of Lightwave Technology*, Vol. 7, No. 5, May 1989 at pp. 794–8.

Referring back to FIG. 2, arrangement 100 is seen to comprise an optical hybrid 110 which is capable of providing polarization and phase independent outputs, and a receiver 130 which includes two separate receiver units 132 and 134. In operation, the received message signal $E_s(t)$ is applied as an input to polarization beam splitter 12 which provides as the pair of orthogonal outputs signals $E_H(t)$ and $E_V(t)$, where signal $E_H(t)$ propagates along first section 14 of polarization maintaining fiber and signal $E_V(t)$ propagates along second section 18 of polarization maintaining fiber. The linearly polarized local oscillator signal $E_{LO}(t)$ is evenly divided, in terms of optical power, by polarization maintaining coupler 22 into first and second components $E_{LO1}(t)$ and $E_{LO2}(t)$, with component $E_{LO1}(t)$ propagating along section 24 of polarization maintaining fiber and component $E_{LO2}(t)$ propagating along section 26 of polarization maintaining fiber. The portion of optical hybrid 110 discussed to this point is identical to that described hereinabove in association with FIG. 1. However, couplers 16 and 20 of hybrid 11 in FIG. 1 are replaced in accordance with this phase independent embodiment of the present invention by first and second phase diversity hybrids 160 and 200, respectively.

In general, phase diversity hybrid 160 includes four separate polarization maintaining couplers and phase shifting means. Particularly, signal component $E_H(t)$ is applied as an input to a first coupler 162 which functions to split $E_H(t)$ into two separate signals, where coupler 162 functions in the same manner as the polarization maintaining couplers previously described. In a similar manner, local oscillator component $E_{LO1}(t)$ is applied as an input to a second coupler 164 which functions to split component $E_{LO1}(t)$ into two separate signals.

In accordance with the phase diversity aspect of this embodiment, the four outputs from couplers 162 and 164 are then phase delayed relative to one another such that there is a 90° phase shift between the two message signals and, similarly, a 90° phase shift between the two local oscillator signals. A first phase shifter 166 is illustrated as coupled to the first output from coupler 162, with a second phase shifter 168 illustrated as coupled to the second output from coupler 164. The phase-delayed message signal is then combined with the non-delayed local oscillator signal in a third coupler 170, where the two outputs from coupler 170 will be a pair of signals with a relative phase difference of 180°. That is, the signal appearing at ports AH and BH of phase hybrid 160 will be linearly polarized (i.e., include only cosine terms). In a similar manner, the remaining message signal component is mixed with the phase-delayed local oscillator signal in a fourth coupler 172, where the pair of outputs from coupler 172 appearing at ports CH and DH will also have a phase difference of 180°, but will be circularly polarized (i.e., include only sine terms) which are orthogonal to the outputs at ports AH and BH. Therefore, the outputs from ports BH, CH, and DH can be defined as having a phase relation of 180°, 90°, and 270° with respect to the output from port AH. In accordance with the teachings of the present invention, the set of four outputs from ports AH, BH, CH and DH of hybrid 160 will all be of the same polarization, defined as the "horizontal" polarization in FIG. 2. The set of four outputs may then be applied as inputs to a first balanced receiver unit 132 of receiver 130, where receiver unit 132 is similar in design to receiver 13 of FIG. 1. The output from receiver unit 132 is thus a current $I_H(t)$ which is independent of the phase of the incoming signals.

The components of the remaining orthogonal polarization may be created in phase diversity hybrid 200, which is identical in form and function to phase diversity hybrid 160 described above. Therefore, the output of phase diversity hybrid 200 will be a set of four signals mixing components $E_V(t)$ and $E_{LO2}(t)$, with the signals at ports BV, CV and DV having a phase relation of 180°, 90°, and 270°, respectively, with the output from port AV. The four "vertical" outputs are then applied as inputs to a second balanced receiver unit 134, identical to receiver unit 132 defined above. Second balanced receiver unit 134 thus produces as an output a current $I_V(t)$ which is independent of phase of the incoming signals. As with the arrangement of FIG. 1, the recovered message signal R(t) is formed in arrangement 100 of FIG. 2 by combining the output currents $I_H(t)$ and $I_V(t)$ from receiver units 132 and 134, respectively in an adder 140. As above, the summation of adder 140 will remove the polarization dependent terms from the recovered message signal.

Figure 3:
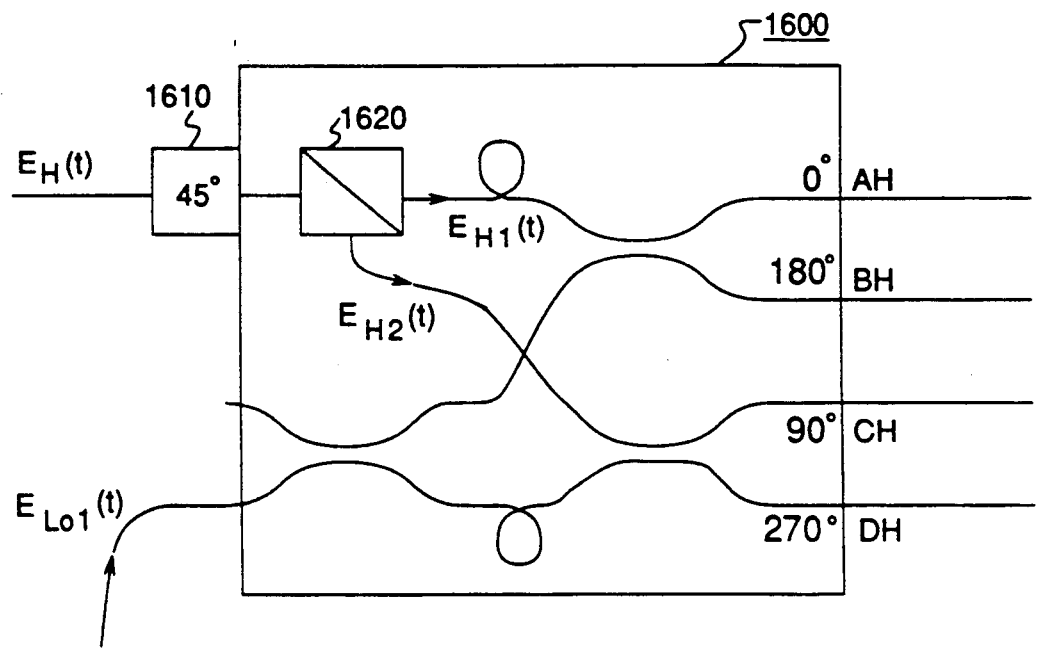
FIG. 3 illustrates an alternative phase diversity portion of an optical hybrid which may be used in the arrangement as illustrated in FIG. 2.

FIG. 3 illustrates an alternative phase diversity hybrid 1600 which may be utilized in the arrangement illustrated in FIG. 2. Basically, coupler 162 of hybrid 160 is replaced in this embodiment with a 45° rotator 1610 and a polarization beam splitter 1620. As shown in FIG. 3, rotator 1610 is positioned at the interface of polarization maintaining fiber 14 and hybrid 1600 so as to provide a 45° rotation to component $E_H(t)$. The rotation allows for polarization beam splitter 1620 to then divide signal $E_H(t)$ into substantially equal components which then propagate through phase shifter 166 and couplers 170, 172 as described above. In a similar manner, component $E_V(t)$ may be propagated through a second 45° rotator with the rotated signal being provided as an input to a second polarization beam splitter. The rotation of signal $E_V(t)$ thus provides as the output from the splitter a pair of signals of relatively equal power.

It is to be understood that there exist a number of modifications to the above-described embodiments which are considered to fall within the scope of the present invention. In particular, another embodiment of the present invention may utilize an alternative demodulating arrangement including single photodiode receivers, instead of the pairs of photodiodes used in the balanced receiver configuration of FIGS. 1 and 2. Additionally, the present invention is not limited to systems utilizing DPSK modulation, since alternative signaling schemes, including but not limited to FSK (frequency-shift keyed) or ASK (amplitude-shift keyed) modulation could also be utilized with the optical hybrid of the present invention. In particular, the use of FSK signaling would result in a received message signal $E_s(t)$ of the form:

$$E_s(t) = \sqrt{2P_s} \cos(\omega_s + \Delta\omega)t,$$

where $\Delta\omega = 0$ for a first logic value and is fixed at a constant for a second logic value. Alternatively, the use of ASK would result in a received message signal $E_s(t)$ of the form:

$$E_s(t) = M(t)\sqrt{2P_s} \cos \omega_s t,$$

where $M(t) = 0$ for a first logic value and $M(t) = M$ for a second logic value.

I claim:

1. In a coherent lightwave detection system, an optical hybrid for providing polarization independent signal recovery, the hybrid including polarization splitting means for dividing a first incoming lightwave message signal into first and second orthogonal components of a first and second polarization state, respectively, and dividing a second incoming lightwave message signal into first and second orthogonal components of said first and second polarization states, respectively, the components of the first and second message signals exiting said splitting means in a manner such that orthogonal components of like polarization state propagate along the same signal path;

means for dividing a first local oscillator signal of a known frequency and known polarization state into first and second components of essentially equal power, and dividing a second local oscillator signal of a frequency different from said first oscillator signal into first and second components of essentially equal power;

first combining means for mixing the first polarization state components of the first and second message signals with the associated first polarization state components of the first and second local oscillator signals, respectively, and providing as an output a plurality of combined signals of the first polarization state; and second combining means for mixing the second polarization state components of the first and second message signals with the associated second polarization state components of the first and second local oscillator signals, respectively, and providing as an output a plurality of combined signals of the second polarization state.

2. An optical hybrid as defined by claim 1 wherein the hybrid is further capable of providing phase independence, the first and second combining means each comprising phase diversity means capable of forming as the plurality of combined output signals a first pair of signals which are separate in phase by 180° and are linearly polarized and a second pair of signals which are separate in phase by 180° and are circularly polarized.

3. An optical hybrid as defined in claim 2 wherein each phase diversity combining means comprises
   a first polarization maintaining coupler responsive to the associated message signal component for providing as separate outputs first and second signals related thereto;
   a second polarization maintaining coupler responsive to the associated local oscillator signal component for providing as separate outputs first and second signals related thereto;
   first phase adjusting means for providing a 90° phase rotation to one output of the first coupler with respect to the remaining output of the first coupler;
   second phase adjusting means for providing a 90° phase rotation to one output of the second coupler with respect to the remaining output of the second coupler;
   a third polarization maintaining coupler responsive to the output from the first phase adjusting means and the non-delayed local oscillator signal for providing as a pair of outputs the first pair of signals of the associated polarization state which are separate in phase by 180°; and
   a fourth polarization maintaining coupler responsive to the output from the second phase adjusting means and the non-delayed message signal for providing as an output a pair of signals of the associated polarization state which are separated in phase by 180° and shifted in phase by 90° with respect to the output from the third polarization maintaining coupler.

4. The optical hybrid as defined in claim 2 wherein each phase diversity combining means comprises
   rotation means for providing a 45° rotation of the associated message signal component;
   polarization beam splitting means coupled to the output of the rotation means for providing a pair of message signal outputs, each output of relatively equal power;
   first combining means coupled to receive the associated local oscillator component for providing as a pair of outputs separate portions of the associated local oscillator component, each portion of relatively equal power;
   first phase adjusting means for delaying the phase of one polarization beam splitting output 90° with respect to the remaining output;
   second phase adjusting means for delaying the phase of one output from the first combining means 90° with respect to the remaining output;
   second combining means coupled to receive the phase-delayed message component and the non-delayed local oscillator component and providing as the first output a pair of signals which are separate in phase by 180°, the first and second polarization maintaining combining means each comprising phase diversity means capable of forming as a set of separate outputs a first pair of signals which are separated in phase by 180° and are linearly polarized and a second pair of signals which are separated in phase by 180° and are circularly polarized; and
   third combining means coupled to receive the phase-delayed local oscillator component and the non-delayed message component and providing as the second output a pair of signals which are separated in phase by 180° and shifted in phase by 90° with respect to the output from the second combining means.

5. A polarization independent coherent lightwave detection arrangement capable of recovering a data signal ($R(t)$) from a received message signal ($E_s(t)$), the detection arrangement comprising:
   an optical hybrid including
   polarization splitting means responsive to the received message signal for dividing said message signal into first ($E_H(t)$) and second ($E_V(t)$) orthogonal components;
   first polarization maintaining combining means responsive to a locally generated lightwave signal of a known polarization state for generating first ($E_{LO1}(t)$) and second ($E_{LO2}(t)$) local components of relatively equal power;
   second polarization maintaining combining means coupled to receive the first components of both said received message signal ($E_H(t)$) and said locally generated lightwave signal ($E_{LO1}(t)$) and comprising phase diversity means for providing as outputs a first pair of signals separated in phase by 180° and linearly polarized, and a second pair of signals separated in phase by 180° and circularly polarized; and
   third polarization maintaining combining means coupled to receive the second components of both said received message signal ($E_V(t)$) and said locally generated lightwave signal ($E_{LO2}(t)$) for providing as outputs a first signal ($E_{V1}(t)$) and a second signal ($E_{V2}(t)$), each containing portions of both said second message and said second local signals;
   the detection arrangement further comprising
   a receiver responsive to the lightwave output signals from the second and third polarization maintaining combining means of said optical hybrid for converting the lightwave signals into electrical representations thereof and combining said electrical representations to provide as an output the recovered data signal.

* * * * *